H. A. & A. C. QUADE.
RAKE.
APPLICATION FILED MAY 7, 1917.
1,255,337.
Patented Feb. 5, 1918.
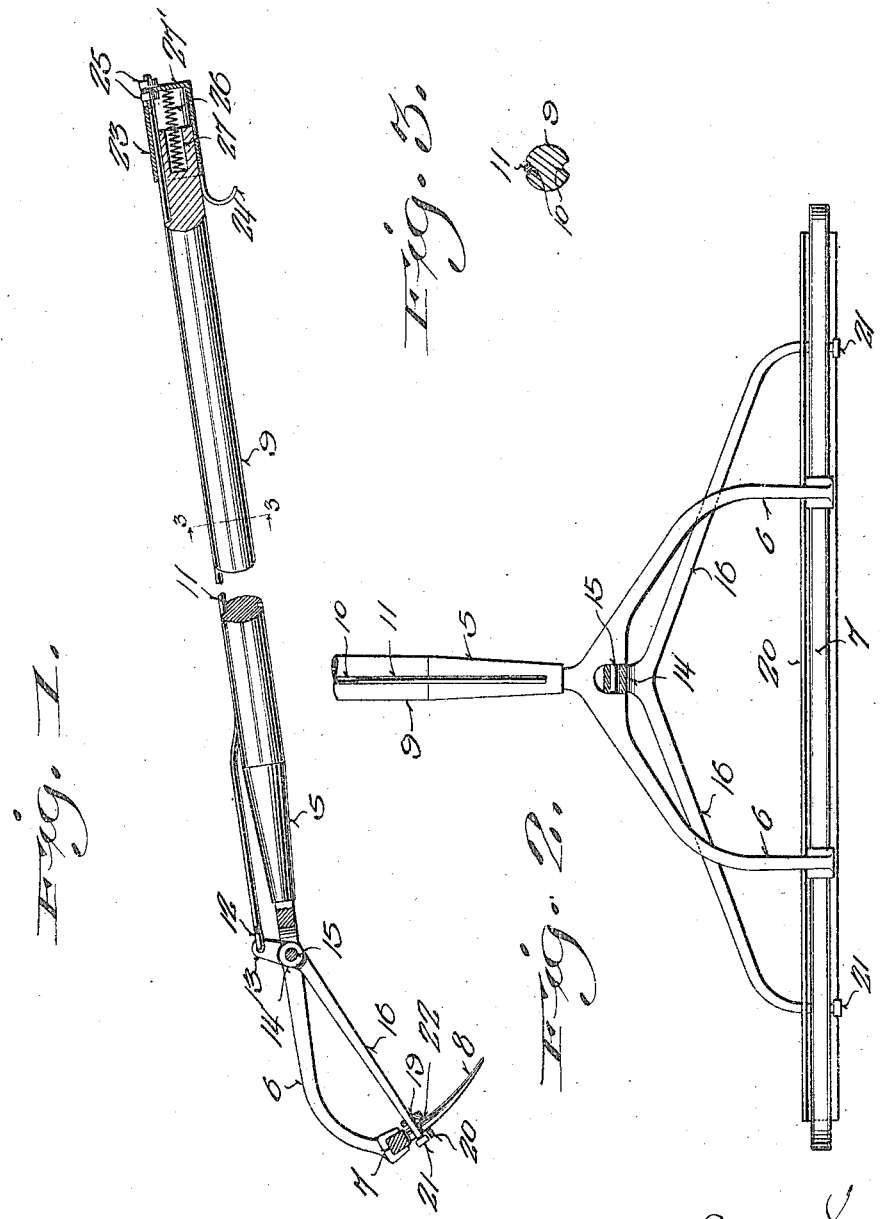

UNITED STATES PATENT OFFICE.

HERMAN A. QUADE AND ALFRED C. QUADE, OF MILWAUKEE, WISCONSIN.

RAKE.

1,255,337.  Specification of Letters Patent.  Patented Feb. 5, 1918.

Application filed May 7, 1917. Serial No. 166,853.

*To all whom it may concern:*

Be it known that we, HERMAN A. QUADE and ALFRED C. QUADE, citizens of the United States, and residents of Milwaukee, in the county of Milwaukee and State of Wisconsin, have invented certain new and useful Improvements in Rakes; and we do hereby declare that the following is a full, clear, and exact description thereof.

Our invention relates to certain new and useful improvements in rakes, and refers more particularly to a rake equipped with means for removing accumulation from the teeth thereof.

The primary object of our invention is to provide means which will effectively remove any accumulated rubbish such as grass, leaves or the like from the rake teeth; and which will be of exceedingly simple construction and therefore inexpensive to manufacture.

With the above and other minor objects in view which will appear as the description proceeds, our invention resides in the novel construction, combination and arrangement of parts substantially as hereinafter described and particularly defined by the appended claims, it being understood that such changes in the precise embodiment of the herein disclosed invention may be made as come within the scope of the claims.

In the accompanying drawing we have illustrated one complete example of the physical embodiment of our invention constructed according to the best mode we have so far devised for the practical application of the principles of our invention; in which—

Figure 1 is a view partly in section and partly in elevation, of a rake equipped with our invention, the section through the rake head, the said view being taken longitudinally through the rake head.

Fig. 2 is a top plan view of the rake portion thereof.

Fig. 3 is a transverse sectional view through the handle showing the disposition therein of the operating rod, being taken on line 3—3 of Fig. 1.

Our invention may be applied to any form of rake which comprises essentially a rake head having formed on one end a socket 5 having arms 6 branching therefrom and carrying on their outer ends a transverse bar 7 having depending therefrom a series of rake teeth 8, the usual handle 9 being employed having its inner end fixed in the socket 5.

The handle 9 has extending longitudinally therein a slot or guide groove 10, in which is guided an operating rod 11 for our cleaning device hereinafter described. The inner end of the rod 11 is pivotally secured as at 12 to the arm 13 of a lever or fulcrum 14 pivoted at 15 in the rake head near the socket 5, the other end of the lever being formed with a pair of divergent arms 16 the outer ends of which slidably engage the openings 19 of a rake teeth cleaning member 20, a collar 21 being secured to the extreme ends of the arms 16 to prevent dislodgment from the member 20. This rake cleaning member is preferably made of angle iron and has therein a series of teeth engaging openings 22 of sufficient size to allow proper play on the teeth.

For operating the rod 11 to force the cleaning member 20 toward the end of the teeth 8 to clean the same, a suitable socket or sleeve member 23 is employed slidable over the outer end of the handle 9 and having formed thereon a hand engaging portion 24, the rod 11 being adjustably secured thereto by means of adjusting nuts 25. In order to normally hold the cleaning member flush against the cross bar 7, a suitable spring 26 is employed, having one end in a socket 27 in the end of the handle, and its other end bearing against the cap or end wall 27 of the socket 23 to urge the same outwardly, as illustrated more clearly in Fig. 1.

From the foregoing description taken in connection with the accompanying drawing, it will be readily apparent that when it is desired to clean the rake teeth, the rod 11 is moved toward the rake head by means of the socket 23, this action causing the lever 14 to force the member 20 toward the end of the teeth, thus removing any material clinging thereto, the spring 26 returning the same to normal position. As will be understood, the rod 11 is so adjusted by means of the nuts 25 as to prevent the movement of the member 20 extending beyond the ends of the rake teeth.

What is claimed:

1. In a rake including a handle and a rake head comprising a handle engaging socket having arms projecting therefrom and carrying at their outer ends a bar provided with depending rake teeth, a teeth cleaning angle plate having a series of apertures in its horizontal portion slidably engaging said rake teeth, an angle lever pivoted at its apex in the rake head at the junction of the arms thereof, a pair of arms carried by the outer end of said lever and loosely engaging a pair of openings in the vertical portion of said angle plate, stops on the ends of said arms outwardly of said angle plate to prevent the dislodgment of the same from the arms of said lever, an operating rod passing longitudinally along the handle and having its inner end pivotally connected with the inner end of the angle lever, a socket slidably engaging the outer end of the rake handle and having the outer end of the operating rod adjustably secured thereto, an expansible spring seated in a recess in the outer end of the handle and bearing against the end wall of said socket member to urge the same outwardly for normally retaining the angle plate against the rake teeth carrying bar, and a hand engaging portion formed on the socket member, substantially as described.

2. In a rake including a handle and rake head comprising a handle engaging socket, having arms projecting therefrom and carrying at their outer ends a bar provided with depending rake teeth, means for cleaning said teeth consisting of an angle plate having apertures therein slidably engaging said rake teeth, an angle lever pivoted in the rake head at the junction of the arms thereof, said lever having its end outward of its pivot forked and loosely secured to said angle plate, an operating rod passing longitudinally along the handle and having its inner end pivotally connected with the inner end of the angle lever, a socket member slidably secured to the outer end of the rake handle and having the outer end of the operating rod adjustably secured thereto, and means in said socket member for normally urging the operating rod outwardly to retain the angle plate against the rake teeth carrying bar, substantially as described.

In testimony that we claim the foregoing we have hereunto set our hands at Milwaukee, in the county of Milwaukee and State of Wisconsin.

HERMAN A. QUADE.
ALFRED C. QUADE.

Copies of this patent may be obtained for five cents each, by addressing the "Commissioner of Patents, Washington, D. C."